United States Patent Office 3,681,122
Patented Aug. 1, 1972

3,681,122
SURFACE CONDITIONER FOR GLASS-CERAMICS
Joseph J. Domicone, Horseheads, and Garo M. Ziver, Corning, N.Y., assignors to Corning Glass Works, Corning, N.Y.
No Drawing. Continuation-in-part of application Ser. No. 671,136, Sept. 27, 1967. This application Mar. 15, 1971, Ser. No. 124,498
Int. Cl. C03c 17/30, 17/28
U.S. Cl. 117—124 F                4 Claims

ABSTRACT OF THE DISCLOSURE

A composition for conditioning the surface of glass-ceramic articles subjected to elevated temperatures and a method of treating such articles by applying to the surface a composition containing a dimethyl silicone fluid whereby a heat resistant protective coating is formed thereon.

---

This application is a continuation-in-part of our co-pending application, Ser. No. 671,136, filed Sept. 27, 1967 now abandoned.

The use of glass and ceramics in producing articles capable of withstanding elevated temperatures is well known. Thus, low expansion borosilicate glasses have been made into cookware sold commercially under the trademark Pyrex and various types of ceramic materials have been used as ovenware.

In a recent development, heat resistant material has been prepared from semicrystalline ceramic bodies, or as they are also known, glass-ceramics. These glass-ceramics are materials which initially have been melted and fabricated as glasses and then have been converted to a predominantly crystalline state by special treatments. Generally, the process comprises melting a glass forming batch into which has been introduced a nucleating or crystallization promoting agent, simultaneously shaping and cooling the melt into a glass body, and thereafter heating the body following a specific heating schedule. In this way, the glass shape is converted into a body composed of fine-grained randomly-oriented crystals dispersed substantially uniformly in a glass matrix and comprising a major portion of the mass of the body. Such a process is described by S. D. Stookey in U.S. Pat. No. 2,920,971. The physical properties of the glass-ceramics are somewhat closer to those of conventional ceramics than they are to the original glass. Heat resistant glass-ceramic materials have been sold commercially as cookware under the trademark Corning Ware. In addition, such materials have been used in making hotplates and stove tops.

The glass-ceramic cookware in addition to its good appearance, also has the advantage that it can be used for cooking, serving, and storing food in a refrigerator and then cooking the food again without being subjected to breakage due to thermal shock. However, after a period of use, there are minor disadvantages which appear in some of these materials. For example, upon being subjected to the normal cooking procedures, the material begins to show undesirable food stains and in addition, food tends to stick to the surface of the cooking vessel. Thus, the cookware may develop a poor appearance and in addition, becomes difficult to clean.

Quite surprisingly, we have found that by applying a temporary coating to the surface of the glass or ceramic material we can protect the surface of the material from the effect of food products which come in contact therewith at the high temperatures of use. The material retains its original appearance, remains quite easy to clean, and food particles do not adhere or stick to the surface. The surfaces of the glass and ceramic articles which come into contact primarily with food products is conditioned with a heat resistant protective coating. More specifically, the terms "conditioned" and "conditioning" as used herein mean placing a temporary protective coating on the surface of the article which eliminates or reduces the adherence of food products at elevated temperatures used during cooking and prevents staining.

It is therefore an object of the present invention to provide a composition for conditioning the surfaces of glass-ceramic articles with a heat resistant protective coating.

It is a further object of the present invention to provide a method for conditioning the surface of glass-ceramic articles with a composition whereby food staining and adherence of food particles to the surface can be substantially eliminated.

In accordance with the present invention, we have discovered a composition for forming a heat resistant protective coating on the surface of glass-ceramic articles comprised of an aqueous suspension or emulsion of a dimethyl silicone fluid incorporated in a paste containing a surfactant, a mild abrasive and a thickening agent. Usually it is desirable to add a sufficient amount of a suspending or emulsifying agent to prevent the mixture from separating.

In the method of the present invention, the glass or ceramic material is treated with the conditioning composition by placing a small portion of the liquid suspension on the surface preferably with a damp applicator, removing the excess conditioner by rinsing or wiping it from the surface, and then optionally polishing the surface to give a more lustrous appearance. The coating produced is temporary and will be adversely affected by exceeding temperatures of around 500° C. and is also consumed by the juices of food products. It must, therefore, be replenished and this should be done typically by retreating the surface when it is cleaned.

The novel composition of the present invention is comprised essentially of two portions: a conditioner and a cleanser (although as used herein in its broad meaning the conditioner includes the cleanser). The conditioner is an aqueous suspension or emulsion of a dimethyl silicone fluid. The dimethyl silicone fluids useful in the present invention should have a viscosity of from about 50 to 60,000 centistockes at 25° C. with the preferred range being about 4,000 to 5,000 centistokes. Typically, when the viscosity is greater than 5,000 centistockes, there is a tendency to form greasy appearing films which, while not harmful, present a poor appearance. Such fluids are available from Dow-Corning and a particularly effective dimethyl silicone oil is sold as Dow-Corning 200 Silicone Fluid. Generally the silicone can be present in an amount of from 0.1 to 5 percent of the total weight of the composition and preferably about 2–5 percent should be used. Since the vehicle is water, it is necessary to add a suspending agent or an emulsifier to properly disperse the silicone fluid in the vehicle. A typical emulsifier is trimethyl ammonium chloride sold under the trademark Ammonyx 27. Additionally, it is desirable to control the stability and flowability of the composition by means of thickeners such as Carbopol. Carbopol is a trademark of the B. F. Goodrich Chemical Company designating a family of water-soluble carboxy vinyl polymer resins. Carbopol resins 934 and 941 are carboxy polymethylene. Coloring agents or toners may also be added. Another unique feature of the composition is that it contains a cleaning portion whereby the surface of the material is conditioned and simultaneously cleaned. The cleaner comprises a detergent or surfactant such as any of the well known anionic, cationic, and non-ionic surfactants, and a mild abrasive of very fine particles such as silica, and sodium metasilicate. Suitable surfactants include, for example, Triton X–100, a nonionic surfactant which is an alkyl aryl polyether alcohol, Tergitol Anionic 7, an anionic surfactant which is a higher aliphatic alcohol derivative, and Stepanol WA–100, a cationic surfactant having lauryl alcohol as the organic base and sodium as the cation. All are commercially available. Typical conditioning compositions according to our invention consist essentially, in weight percent, of about 0.1–5% dimethyl silicone oil, 5–25% silica, 0–1.0% sodium metasilicate, 0.5–5.0% surfactant, 0–0.5% thickener, 0–1.0% emulsifier, and the remainder water.

The product, after it has been treated with the conditioning composition, contains a very thin protective film or coating. The treated surface is lubricated such that scratching and scuffing together with adherence of food particles are minimized. The coated surface is also non-wetting thereby minimizing the contact area of any spilled material such that it does not tend to spread. In some instances, especially after glass-ceramic cookware has been used for a considerable period of time, it may develop a stainable porous surface. But upon treatment with the novel composition, the silicone coating is formed on the surface and within the pores, thereby minimizing penetration and avoiding staining. However, as we have stated hereinabove, the coating is only temporary and must be frequently replenished, since it is consumed by the juices of foods. The fact that minor amounts of the composition may be present in the food makes it mandatory that it contain no ingredients which are deleterious to human consumption. Thus, certain highly alkaline abrasives such as the quaternary ammonium silicates and tetrasodium pyrophosphate, inedible polishing agents such as the phenolic resins and carnauba wax, toxic solvents such as butyl "Cellosolve," corrosion inhibitors such as sodium dichromate, and any other harmful substances must be excluded from the compositions of the present invention.

Our invention is further illustrated by the following examples:

EXAMPLE I

A conditioner was made containing the following weight percentages of the indicated materials:

|  | Wt. percent |
|---|---|
| Dimethyl polysiloxane | 4.94 |
| Silica | 25.0 |
| Sodium metasilicate | 1.0 |
| Nonionic surfactant | 1.0 |
| Thickener | 0.35 |
| Trimethyl ammonium chloride | 0.26 |
| Water | Remainder |

The conditioner was prepared by initially forming an aqueous emulsion of 43.5% by weight of Dow-Corning Silicone Fluid 200 (viscosity of 350 centistokes at 25° C.), 1.5% perchloroethylene, 9.0% Ammonyx 27 (trimethyl ammonium chloride) and 46% water. The aqueous emulsion, in an amount of 10% by weight was mixed with 1% sodium metasilicate, 1% Triton X–100 (nonionic surfactant), 0.35% Carbopol 941 (thickener), 25.0% Celite (silica) and 62.6% water.

EXAMPLE II

Another illustrative conditioner formulation similar to that of Example I was prepared. An initial silicone fluid emulsion was formed from 30% by weight Dow-Corning Silicone Fluid 200 (viscosity of 4,000 centistokes at 25° C.), 1.5% Ammonyx 27, and 68.5% water. The silicone emulsion, 11% by weight, was added to 1% by weight sodium metasilicate, 0.45% Ammonyx 27, 0.35% Carbopol 934, 1% Triton X–100, 2.0% Turquoise toner, 12.5% Celite, and 71.7% water.

EXAMPLE III

The ability of the conditioner to protect glass-ceramic material from food stains was determined by subjecting the materials to some particularly severe food staining tests. A small amount of the conditioners prepared as in Example I and Example II were applied to 3" x 4" pieces of polished glass-ceramic material designated as Code 9608 and sold commercially under the trademark "Corning Ware."

The food staining tests consisted of applying canned sliced carrots to one portion of the polished treated surface and canned spinach to another portion thereof. The plates were then fired in an electric furnace at 550° F. for one hour. Upon completion of the firing cycle, the plates were allowed to cool to room temperature. Each plate was then cleaned with the same conditioner with which it was originally conditioned prior to the tests.

On repeated tests it was found that the conditioned glass-ceramic material showed a substantial absence of food staining and removal of food waste products required a minimum of effort when the conditioner was applied.

EXAMPLE IV

Another test to show the effectiveness of the conditioner was performed using glass-ceramic material commercially available as Corning Ware petite pans. The samples were divided into two groups:

Group A—consisted of non-treated pans which were used just as purchased.

Group B—consisted of pans which were treated with the silicone conditioner of Example I.

After various common foods had been prepared in the pans, the food was scraped out with a rubber spatula. The pans were then washed in a household detergent without soaking. Any food sticking hard to the Group A (untreated) pans was removed by using Babo kitchen cleanser. Food adhering to the Group B (treated) pans was removed using the conditioner. When the Group B pans were clean, they were given a coating of the conditioner, rinsed and lightly dried. Thus, the silicone coating worn off during use and washing was replaced.

Below are listed some of the foods prepared during the study:

| | |
|---|---|
| spaghetti | various puddings |
| scalloped potatoes | sweet, sticky pastries |
| sweet potatoes | potatoes au gratin |
| tomatoes | hamburger |
| macaroni and cheese | chicken |
| cream style corn | squash |
| souffles | |

During the first five cycles or so, the contribution of silicones to nonsticking of the pans appeared minimal. After ten uses or so, the buildup of silicones appeared sufficient to make a very noticeable decrease in adhesion of foods to the pans.

The pans used in this study were purchased new. This fact accounts for the ease of cleaning of all groups during the first few uses. Since the interiors of the pans all had good glaze coverage and are thus relatively nonporous, the addition of silicones does not have much effect. After a few uses, however, the glaze becomes aged. It is then that the addition of a silicone layer becomes particularly effective. The smooth, nonwetting surface results in much less food adhesion than the comparatively rough surface of the untreated pans.

EXAMPLE V

The conditioner of Example I was subjected to a series of actute toxicity studies to determine the suitability of the compositions of the present invention for use in connection with glass-ceramic cooking utensils. The tests performed included acute oral administration to rats in dosages up to 10.0 gm./kg. of body weight, acute dermal application to rabbits in dosages up to 10 gm./kg. of body weight for 24 hours, patch tests for primary skin irritation in rabbits on abraded and unabraded skin areas for 24 hours, acute eye application to rabbits, and acute inhalation exposure wherein rats were place in an atmosphere containing concentrations of up to about 195 mg./liter of the composition for periods of one hour. No mortalities or illness occurred during any of the acute tests, and the skin patch tests results indicated that the composition has a very low order of skin irritative potential. The acute eye application produced moderate redness, slight swelling and slight or moderate discharge from eye tissues, but there was no evidence of systemic toxicity. Accordingly, it was concluded that the compositions of the present invention are safely ingestible and essentially free of constituents deleterious to human consumption. The fact that the method of the present invention represents a useful short-term aid to the problem of food sticking to glass-ceramics has been established.

We claim:

1. A method of cleaning and conditioning the surface of a glass-ceramic article with a heat-resistant, food-stain preventive coating comprising the steps of applying to the surface thereof a composition consisting essentially, in weight percent, of about 0.1–5.0% dimethyl silicone oil, 5–25% silica, 0–1.0% sodium metasilicate, 0.5–5.0% surfactant, and the remainder water, manipulating the composition on the surface to cause a cleansing action, and removing the excess of said composition by rinsing or wiping it from the surface to leave a thin film of dimethyl silicone oil, said film and composition being non-deleterious to human consumption.

2. A glass-ceramic article conditioned by the method of claim 1.

3. A method according to claim 1 wherein the composition further contains trimethyl ammonium chloride as an emulsifier in an amount up to about 1.0% by weight.

4. A method according to claim 3 wherein the composition further contains carboxy polymethylene as a thickener in an amount up to about 0.5% by weight.

References Cited

UNITED STATES PATENTS

| | | | |
|---|---|---|---|
| 3,183,110 | 5/1965 | Aler et al. | 106—287 R |
| 3,196,027 | 7/1965 | White et al. | 106—287 R |
| 3,308,080 | 3/1967 | Haenni | 260—29.1 |

FOREIGN PATENTS

| | | | |
|---|---|---|---|
| 578,717 | 6/1959 | Canada | 106—2 X |

EDWARD G. WHITBY, Examiner

U.S. Cl. X.R.

106—2; 117—94, 161 ZA; 126—19; 134—2, 22 R; 220—64; 252—140, 528, 531, Dig. 3